(No Model.)

A. B. HENDRYX.
CHAIN PULLEY.

No. 285,263. Patented Sept. 18, 1883.

Witnesses

Andrew B. Hendryx
Inventor

UNITED STATES PATENT OFFICE.

ANDREW B. HENDRYX, OF NEW HAVEN, ASSIGNOR TO THE BRADLEY & HUBBARD MANUFACTURING COMPANY, OF MERIDEN, CONNECTICUT.

CHAIN-PULLEY.

SPECIFICATION forming part of Letters Patent No. 285,263, dated September 18, 1883.

Application filed June 30, 1883. (No model.)

*To all whom it may concern:*

Be it known that I, ANDREW B. HENDRYX, of New Haven, in the county of New Haven and State of Connecticut, have invented a new Improvement in Chain-Pulleys; and I do hereby declare the following, when taken in connection with accompanying drawings and the letters of reference marked thereon, to be a full, clear, and exact description of the same, and which said drawings constitute part of this specification, and represent, in—

Figure 1:
Figure 2:
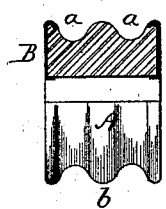
Figure 3:
Figure 4:
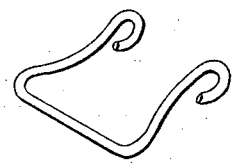

Figure 1, the metal pulley as heretofore made, enlarged; Fig. 2, a sectional side view, showing my improvement, enlarged; Fig. 3, the chain to which this pulley is particularly adapted, full size; Fig. 4, one of the links in perspective, detached, enlarged.

This invention relates to an improvement in chain-pulleys such as required in extension lamp-fixtures in which the lamp is suspended above. These pulleys are usually made from metal. The metal chain running over metal pulleys and the metal pulleys on metal bearings, in connection with the metal fixture, produces a disagreeable rattling noise—a serious objection to this class of fixtures.

The object of my invention is to construct a pulley which shall be durable and yet a non-conductor of sound, whereby the above-mentioned difficulties may be avoided; and it consists in a pulley made from wood, paper, or other known non-conductor of sound, having its ends (one or both) inclosed by a metal cap, as more fully hereinafter described.

In illustrating my invention I show a pulley adapted to the peculiar chain shown in Fig. 3, which is now used for this class of fixtures. The links of this chain are made from wire, the central portion left straight to form a bar, the two sides turned into the same plane and nearly parallel with each other, and the ends of the two sides bent around the bar of the next link, as seen in Fig. 3. The pulley for this chain, which has heretofore been made from metal, is of the shape seen in Fig. 1, having two annular grooves, *a*, distant from each other corresponding to the two sides of the link, and with an annular rib, *b*, between them. This peculiar pulley is not my invention.

In carrying out my invention I make a body, A, preferably of wood, but may be of paper or other non-conductor of sound, having the grooves *a a* and the rib *b* formed therein, the same as in the metal pulley, and then over the ends of the pulley I place a sheet-metal cap, B. This cap is composed of a disk, the edges turned over the edge of the pulley and so as to clasp upon the end of the pulley. These caps thus clasped upon the ends support the pulley, prevent its splitting, and protect it from wear at the sides against the metal supports. The non-metallic part of the body of the pulley holds the chain better than metal—that is, the chain adheres more strongly to it than it does to metal—and thereby insures a more even working of the several chains in the fixture, and because of its non-conducting nature the rattling noise, or the noise arising from the working of the chains in the pulleys, is almost entirely avoided.

While I prefer to inclose both ends of the pulley with a cap which will clasp the edges, the cap applied to one end will answer a very good purpose and generally prevent the splitting of the pulley. I therefore do not wish to be understood as limiting my invention to the capping of both ends of the pulley.

I have illustrated my invention as applied only to pulleys for one class of chain; but it will be understood that the invention is applicable to any of the known classes of chain-pulleys, it only being essential to my invention that the body shall be of a non-metallic material having its ends inclosed by a metal cap.

I do not wish to be understood as claiming, broadly, a non-metallic pulley having metal-capped ends, as such, I am aware, is not new.

I claim—

The herein-described improvement in chain or grooved pulleys, consisting of the non-metallic body A, combined with the sheet-metal cap at its two ends, the edges of the cap turned over the thin edges of the pulley, whereby the caps are not only firmly secured to the pulleys, but serve as a protection therefor, substantially as described.

ANDREW B. HENDRYX.

Witnesses:
LE GRAND CANNON,
EDWARD N. PECK.